United States Patent
Kamisaka

(10) Patent No.: US 10,012,163 B2
(45) Date of Patent: Jul. 3, 2018

(54) ELECTRONIC CONTROL UNIT

(71) Applicant: DENSO CORPORATION, Kariya, Aichi-pref. (JP)

(72) Inventor: Tatsuki Kamisaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 15/337,423

(22) Filed: Oct. 28, 2016

(65) Prior Publication Data
US 2017/0175658 A1    Jun. 22, 2017

(30) Foreign Application Priority Data

Dec. 21, 2015 (JP) .................................. 2015-248570

(51) Int. Cl.

| | |
|---|---|
| F02D 41/00 | (2006.01) |
| F02D 41/10 | (2006.01) |
| F02D 41/26 | (2006.01) |
| F02D 41/30 | (2006.01) |
| B60W 30/14 | (2006.01) |
| F02D 41/24 | (2006.01) |

(52) U.S. Cl.
CPC ........... *F02D 41/10* (2013.01); *B60W 30/143* (2013.01); *F02D 41/26* (2013.01); *F02D 41/3005* (2013.01); *F02D 41/0002* (2013.01); *F02D 41/2441* (2013.01); *F02D 41/30* (2013.01); *F02D 2200/501* (2013.01); *F02D 2200/602* (2013.01); *F02D 2250/18* (2013.01)

(58) Field of Classification Search
CPC ...... F02D 41/10; F02D 41/26; F02D 41/3005; F02D 2250/18; F02D 2200/602; F02D 41/30; F02D 41/2441; F02D 41/0002; F02D 2200/501; B60W 30/143
See application file for complete search history.

(56) References Cited

U.S. PATENT DOCUMENTS

| | | | | |
|---|---|---|---|---|
| 4,047,507 A | * | 9/1977 | Noguchi | F02D 31/001 123/344 |
| 4,354,467 A | * | 10/1982 | Noddings | B60K 31/105 123/352 |

(Continued)

FOREIGN PATENT DOCUMENTS

JP   2009-185765 A   8/2009

*Primary Examiner* — Thomas Moulis
(74) *Attorney, Agent, or Firm* — Posz Law Group, PLC

(57) ABSTRACT

In an electronic control unit, a basic injection quantity calculation part calculates a basic injection quantity value as a target of fuel value, which an injector injects, by using an actual accelerator operation angle value, an actual engine rotation speed value and at least one of an actual vehicle speed value and an actual acceleration value. When the actual vehicle speed value or the acceleration value deviates largely from the estimated value, a correction value calculation part calculates an injection quantity correction value for the basic injection quantity value and a final injection quantity calculation part calculates a final injection quantity value by correcting the basic injection quantity value with the correction value. A driving control part controls driving of the injector so that the injector injects fuel of the final injection quantity value determined by correcting the basic injection quantity value with the correction value.

7 Claims, 8 Drawing Sheets

(56) References Cited

U.S. PATENT DOCUMENTS

| | | | |
|---|---|---|---|
| 4,853,720 A * | 8/1989 | Onari | B60K 31/0008 123/350 |
| 4,913,006 A * | 4/1990 | Tsuyama | B60K 31/047 180/175 |
| 4,964,051 A * | 10/1990 | Sekozawa | F02D 11/10 123/492 |
| 4,984,545 A * | 1/1991 | Kaneyasu | B60K 31/047 123/352 |
| 5,125,292 A * | 6/1992 | Matsuoka | B60W 30/18 123/559.3 |
| 5,361,207 A * | 11/1994 | Hayafune | F16H 59/66 477/120 |
| 5,454,358 A * | 10/1995 | Hattori | F02D 11/105 123/399 |
| 5,508,923 A * | 4/1996 | Ibamoto | B60K 31/047 701/58 |
| 5,531,654 A * | 7/1996 | Ishikawa | F16H 61/0213 477/120 |
| 5,625,558 A * | 4/1997 | Togai | B60K 31/047 123/349 |
| 5,925,087 A * | 7/1999 | Ohnishi | F16H 59/66 701/1 |
| 6,282,465 B1 * | 8/2001 | Nishijima | B60W 10/06 477/120 |
| 6,304,806 B1 * | 10/2001 | Colby | F02D 11/105 701/110 |
| 6,416,441 B1 * | 7/2002 | Eckert | B60W 10/06 477/185 |
| 6,427,108 B1 * | 7/2002 | Kanasugi | B60K 28/165 477/118 |
| 7,779,812 B2 * | 8/2010 | Leone | F02D 41/021 123/403 |
| 8,826,885 B2 * | 9/2014 | Asada | F02D 11/106 123/399 |
| 8,977,461 B2 * | 3/2015 | Matsushita | B60W 10/06 701/70 |
| 2002/0010539 A1 * | 1/2002 | Machida | F02D 31/007 701/104 |
| 2004/0078352 A1 * | 4/2004 | Fujime | G06N 3/04 706/26 |
| 2007/0162210 A1 * | 7/2007 | Kitaori | B60W 10/06 701/51 |
| 2010/0004848 A1 * | 1/2010 | Transou, Jr. | B60W 30/143 701/110 |
| 2013/0151090 A1 * | 6/2013 | Chae | B60T 7/12 701/54 |
| 2015/0298699 A1 * | 10/2015 | Poechmueller | B60W 50/0097 701/25 |
| 2015/0307098 A1 * | 10/2015 | Maeda | B60W 30/143 477/120 |
| 2016/0236686 A1 * | 8/2016 | Hattori | B60W 30/188 |
| 2016/0281626 A1 * | 9/2016 | Ito | F02D 41/22 |

* cited by examiner

ELECTRONIC CONTROL UNIT

CROSS REFERENCE TO RELATED APPLICATION

This application is based on Japanese patent application NO. 2015-248570 filed on Dec. 21, 2015, whole contents of which are incorporated herein by reference.

FIELD

The present disclosure relates to an electronic control unit.

BACKGROUND

JP 2009-185765A discloses one exemplary configuration of an electronic control apparatus, which controls a vehicle travel speed to a constant speed. This conventional apparatus stores as a reference vehicle speed a vehicle speed, when an accelerator operation angle and a vehicle speed are both constant for a predetermined period. When the vehicle speed changes from the reference vehicle speed by more than a predetermined value in spite of the accelerator operation angle being maintained at the same operation angle, the vehicle speed is controlled to return to the reference vehicle speed.

When a vehicle travels, the vehicle receives traveling resistances such as air resistance, rolling resistance and slope resistance. The air resistance and the rolling resistance are variable with a shape, a weight and the like of an individual vehicle. The slope resistance is variable with a road characteristic such as an inclination of a road. For this reason, when the weight of the vehicle increases or the vehicle enters an uphill slope from a level road, the traveling resistance increases and impedes acceleration of the vehicle, which a driver desires. In this respect, the conventional apparatus controls the vehicle speed to return to the reference vehicle speed when the vehicle speed deviates from the reference speed by the predetermined value. This control however only returns the vehicle speed to the reference vehicle speed, which was stored when the accelerator operation angle was constant for the predetermined period. That is, the conventional apparatus cannot increase the vehicle speed to be higher than the reference vehicle speed even when the driver desires a higher vehicle speed. As a result, it is not possible to attain the acceleration, which the driver desires.

SUMMARY

It is therefore an object to provide an electronic control unit, which is capable of attaining acceleration as a driver desires, even in a state that the acceleration desired by the driver is not possible.

According to one aspect, an electronic control for controlling an internal combustion engine comprises a basic physical quantity calculation part, a history storage part, an estimated value calculation part, a comparison part, a correction value calculation part, a final physical quantity calculation part and a driving control part.

The basic physical quantity calculation part calculates, as a basic physical quantity value, a target physical quantity value related to an acceleration of a vehicle based on an actual accelerator operation angle value, an actual engine rotation speed value and at least one of an actual vehicle speed value and an actual acceleration value. The history storage part stores the actual accelerator operation angle value, the actual engine rotation speed value and at least one of the actual vehicle speed value and the actual acceleration value. The estimated value calculation part calculates at least one of an estimated vehicle speed value and an estimated acceleration value estimated from the history. The comparison part for performs at least one of comparison of the actual vehicle speed value with the estimated vehicle speed value and comparison of the actual acceleration value with the estimated acceleration value. The correction value calculation part calculates a correction value for the basic physical quantity value based on at least one of a comparison result between the actual vehicle speed value and the estimated vehicle speed value and a comparison result between the actual acceleration value and the estimated acceleration value. The final physical quantity calculation part calculates a final physical quantity value by correcting the basic physical quantity value with the correction value. The driving control part controls the internal combustion engine based on the final physical quantity value calculated by correcting the basic physical quantity with the correction value.

DETAILED DESCRIPTION OF EMBODIMENT

First Embodiment

Figure 1:
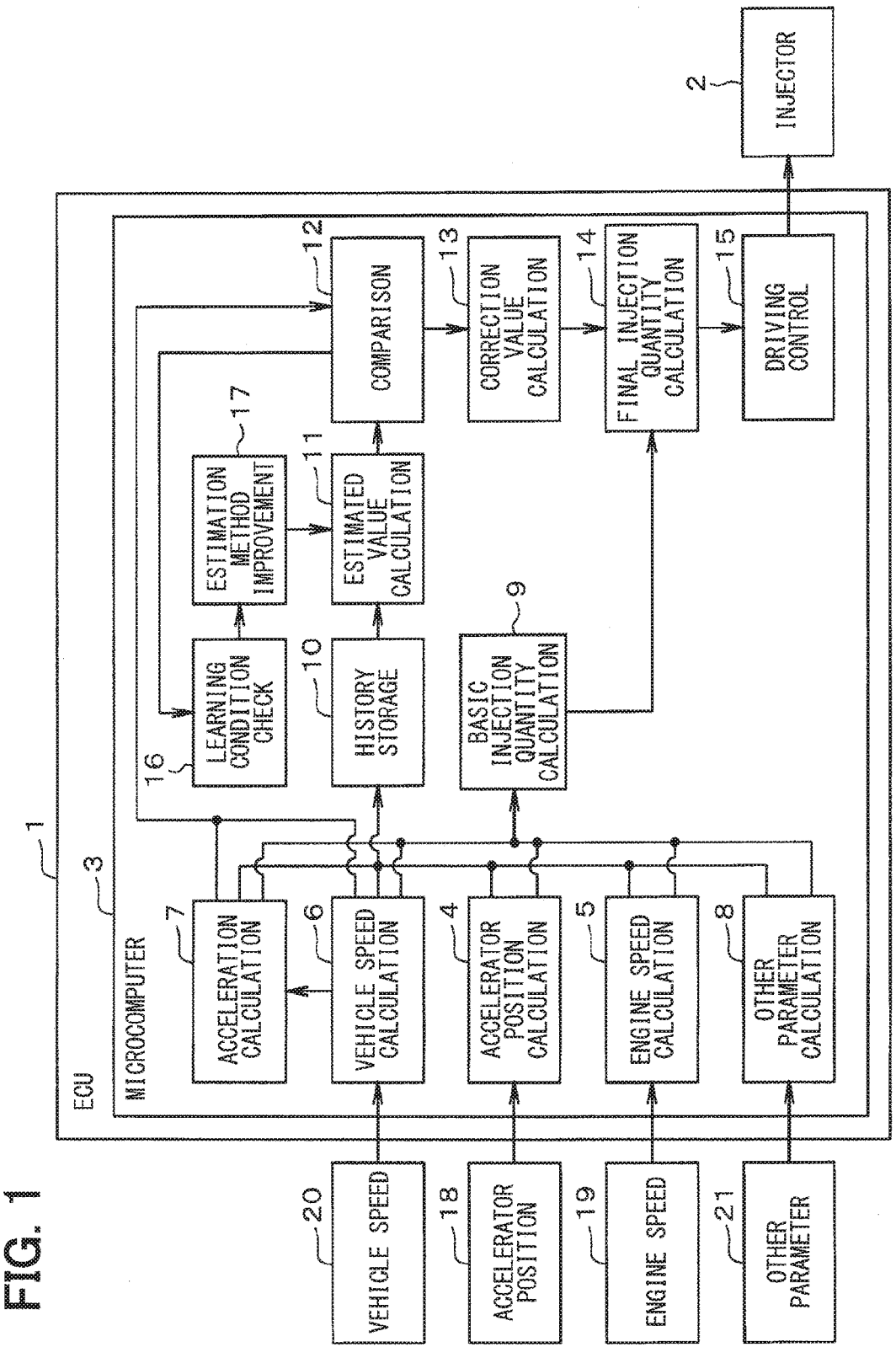
FIG. 1 is a functional block diagram showing a first embodiment of an electronic control unit.

A first embodiment of an electronic control unit will be described with reference to FIG. 1 to FIG. 4. An electronic control unit (ECU) 1 is provided to control driving of an injector 2, which injects fuel into an internal combustion engine (not shown) so that a vehicle travels at a target vehicle speed value. The target vehicle speed value is not limited to a constant speed value, to which the actual vehicle value is feedback-controlled. The ECU 1 includes a microcomputer 3, which includes a CPU, a ROM, a RAM, an I/O and the like and controls en entire operation of the electronic control unit 1 by execution of computer programs. The microcomputer 3 has, as functions to perform by software, an accelerator operation angle calculation part 4, an engine rotation speed calculation part 5, a vehicle speed calculation part 6, an acceleration calculation part 7, an other parameter calculation part 8, a basic injection quantity calculation part 9 as a basic physical quantity calculation part, a history storage part 10, an estimated value calculation part 11, a comparison part 12, a correction value calculation part 13, a final injection quantity calculation part 14 as a final physical quantity calculation part, a driving control part 15, a learning condition check part 16 and an estimation method improvement part 17.

The accelerator operation angle calculation part 4 calculates an actual accelerator operation angle value, which indicates an actual measured value of an accelerator operation angle, based on a detection signal inputted from an accelerator operation angle sensor 18. The engine rotation speed calculation part 5 calculates an actual engine speed value, which indicates an actual measured value of an engine rotation speed, based on a detection signal inputted from an engine rotation speed sensor 19. The vehicle speed calculation part 6 calculates an actual vehicle speed value, which indicates an actual measured value of a vehicle travel speed, based on a detection signal inputted from a vehicle speed sensor 20. The acceleration calculation part 7 calculates an actual acceleration value, which indicates an actual measured value of acceleration, based on the actual vehicle speed calculated by the vehicle speed calculation part 6. The other parameter calculation part 8 calculates actual other parameters, which will be effective to control driving of the injector 2, based on detection signals inputted from the other parameter sensors 21. The other parameter sensors 21 are, for example, an intake pressure sensor, an atmospheric pressure sensor, a common rail pressure sensor and a water coolant temperature sensor.

The injection quantity calculation part 9 calculates a basic injection quantity value as a basic physical quantity value, which indicates a target quantity value of fuel to be injected by the injector 2 to change engine power output, based on at least one of the actual accelerator operation angle value, the engine rotation speed value, the vehicle speed value and the acceleration value. The history storage part 10 stores, as a history, a chronological change of at least one of the actual accelerator operation angle value, the engine rotation speed value, the vehicle speed value and the acceleration value. The estimated value calculation part 11 calculates an estimated vehicle speed value, which indicates an estimated value of the vehicle speed by estimating the vehicle speed from the history based on a predetermined estimation method (that is, algorithm) and calculates an estimated acceleration value by estimating the acceleration from the history.

The estimated vehicle speed value and the estimated acceleration value may be calculated, as one example, by using a data map, which defines relations of the estimated vehicle speed value and the estimated acceleration value relative to the detected vehicle acceleration value and the detected accelerator position. The estimated acceleration value may be calculated, as another example, based on the following equation: the estimated vehicle acceleration value={(driving force of the engine)−(air resistance)−(rolling resistance)}/vehicle weight. The driving force of the engine has a positive correlation with the accelerator position. The air resistance is proportional to the square the vehicle speed. The air resistance is proportional to the vehicle weight. When the actual value deviates from the estimated value, it is assumed that the vehicle is subjected to a force (for example, slope resistance) different from the above-referred three forces. In this case, the driving force of the engine is corrected.

The comparison part 12 compares the actual vehicle speed value inputted from the vehicle speed calculation part 6 with the estimated vehicle speed value inputted from the estimated value calculation part 11 and also compares the actual acceleration value inputted from the acceleration calculation part 7 with the estimated acceleration value inputted from the estimated value calculation part 11. The correction value calculation part 13 calculates an injection quantity correction value for the basic injection quantity value based on comparison results inputted from the comparison part 12. That is, when a difference between the actual vehicle speed value and the estimated vehicle speed value is equal to or larger than a first predetermined value, the correction value calculation part 13 calculates the injection quantity correction value so that the actual vehicle speed approaches a target value of the vehicle speed. In one exemplary case, when the estimated vehicle speed value exceeds the target vehicle speed value, the target speed value is decreased to be between the actual vehicle speed value and the estimated vehicle speed value and closer to the estimated vehicle speed value. When a difference between the actual acceleration value and the estimated acceleration value is equal to or larger than a second predetermined value, the correction value calculation part 13 further calculates the correction value so that the actual acceleration approaches a target value of the acceleration. The target acceleration value is between the actual acceleration value and the estimated acceleration value and closer to the estimated acceleration value.

The final injection quantity calculation part 14 calculates the final injection quantity value by correcting the basic injection quantity value with the injection quantity correction value, when the injection quantity correction value is calculated by the correction value calculation part 13. The final injection quantity calculation part 14 calculates the final injection quantity value by using the basic injection quantity value itself, when the injection quantity correction value is not calculated by the correction value calculation part 13. The driving control part 15 outputs a command value indicating the final injection quantity value to the injector 2 and controls driving of the injector 2 so that the injector 2 injects an injection quantity of fuel, which is equal to the final injection quantity value.

The learning condition check part 16 checks, based on the comparison result of the comparison part 12, whether a learning condition is satisfied. That is, the learning condition check part 16 determines that the learning condition is satisfied when the difference between the actual vehicle speed value and the estimated vehicle speed value continues to be smaller than a predetermined speed difference value (third predetermined value) for a first predetermined period. The learning condition check part 16 further determines that the learning condition is satisfied when the difference between the actual acceleration value and the estimated acceleration value continues to be smaller than a predetermined acceleration difference value (fourth predetermined value) for a second predetermined period. The estimation method improvement part 17 improves an estimation method for estimating the estimated vehicle speed value and the estimated acceleration value, when the learning condition is satisfied.

An operation of the first embodiment described above will be described next with reference to FIG. 2 to FIG. 4. The microcomputer 3 executes processing of calculating the basic injection quantity value, checking whether the calculated basic injection quantity value need be corrected, and calculating the final injection quantity value. When the basic injection quantity value need be corrected, the microcomputer 3 corrects the basic fuel injection quantity value in calculating the final injection quantity value. In this description, the microcomputer 3 is exemplified to check whether the basic injection quantity value need be corrected based on the comparison between the actual vehicle speed value and the estimated vehicle speed value.

When a start condition for execution of checking whether the basic injection quantity value need be corrected, the microcomputer 3 calculates, by the estimated value calculation part 11, the estimated vehicle speed value by estimating the vehicle speed value from the history in accordance with a preset estimation method at step S1. The microcomputer 3 then calculates the actual vehicle speed value by the vehicle speed calculation part 6 at step S2 and compares the actual vehicle speed value and the estimated vehicle speed value by the comparison part 12 at step S3. When the microcomputer 3 determines that the difference between the actual vehicle speed value and the estimated vehicle speed value is equal to or larger than the first predetermined value by the correction value calculation part 13, the microcomputer 3 determines that the basic injection quantity value need be corrected at step S4 (YES) and calculates the injection quantity correction value at step S5 so that the actual vehicle speed value is controlled to the target vehicle speed value.

The microcomputer 3 then calculates the final injection quantity value by the final injection quantity calculation part 14 by correcting the basic injection quantity value with the injection quantity correction value at step S6. The microcomputer 3 outputs the command value indicating the calculated final injection quantity value for the injector 2 and controls driving of the injector 2 at step S7 so that the injector 2 injects the same injection quantity of fuel as commanded. The microcomputer 3 thus controls the injector 2 to inject fuel, the quantity of which corresponds to the final injection quantity value calculated by applying the correction value to the basic fuel injection quantity value, by performing the operation described above.

Figure 3:
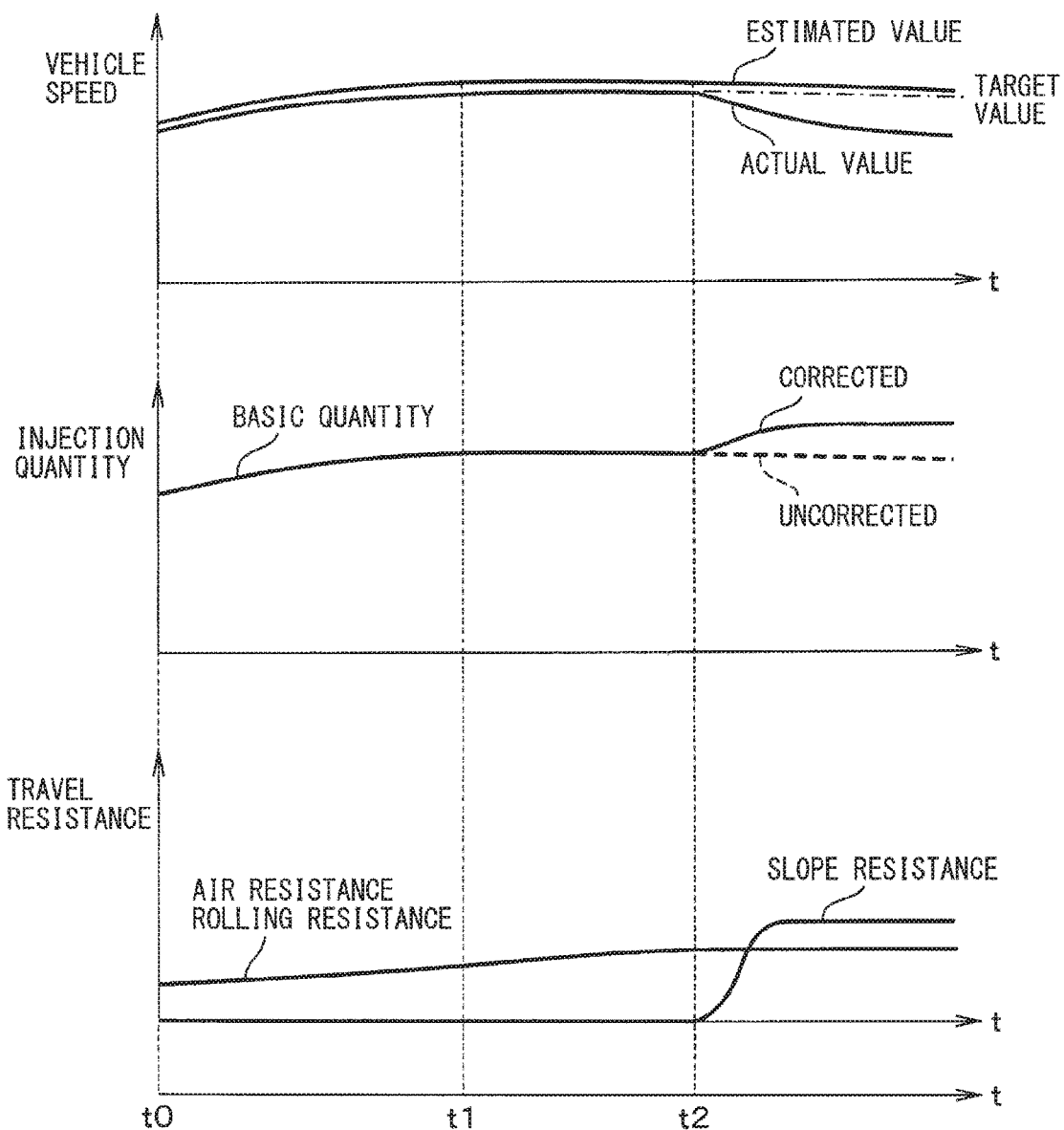
FIG. 3 is a timing chart showing a control operation performed by the control processing shown in FIG. 2.

That is, as shown in FIG. 3, when the slope resistance increases at time t2 as a result of entering of the vehicle from the level ground into the upslope, for example, the actual vehicle speed value decreases and deviates from the estimated vehicle speed value. When the difference between the actual vehicle speed value and the estimated vehicle speed value equals to or exceeds a first predetermined value, the microcomputer 3 calculates the injection quantity correction value and calculates the final injection quantity value by correcting the basic fuel injection quantity with the injection quantity correction value. The microcomputer 3 controls the driving of the injector 2 by the command value, which indicates the final injection quantity value calculated by correcting the basic injection quantity value with the correction value, thereby to accelerate the vehicle.

When the difference between the actual vehicle speed value and the estimated vehicle speed value does not equal or exceed the first predetermined value (that is, the difference is smaller than the first predetermined value), the microcomputer 3 determines that the basic fuel injection quantity value need not be corrected at step S4 (NO). The microcomputer 3 calculates the final injection quantity value to be equal to the basic injection quantity value itself by the final injection quantity calculation part 14 at step S8 without calculation of the injection quantity correction value. The microcomputer 3 outputs the command value indicating the calculated final injection quantity value to the injector 2 and controls driving of the injector 2 at step S7 so that the injection quantity of fuel injected from the injector 2 equals the final injection quantity value.

The microcomputer 3 then checks at step S9 by the learning condition check part 16 whether the learning condition is satisfied. The microcomputer 3 determines that the learning condition is satisfied (YES), when the learning condition check part 16 determines that the difference between the actual vehicle speed value and the estimated vehicle speed value continued to be smaller than the third predetermined value for the first predetermined period. The microcomputer 3 improves the estimation method for estimating the estimation value of the vehicle speed at step S10 in the estimated value calculation part 11 by the estimation method improvement part 17. Since the difference between the actual vehicle speed value and the estimated vehicle speed value, which continued for the first predetermined period, is not caused by the road characteristic such as a road slope, but is caused by the vehicle characteristic such as the vehicle shape or the vehicle weight. The microcomputer 3 therefore improves the estimation method so that the estimated vehicle speed value matches the actual vehicle speed value.

That is, the microcomputer 3 improves the estimation method to eliminate influence of the air resistance and the rolling resistance, which depend on the vehicle characteristic. That is, as shown in FIG. 3, when the microcomputer 3 determines that the difference between the actual vehicle speed value and the estimated vehicle speed value is smaller than the third predetermined value continuously during the first predetermined period from time t0 to time t1 before time t2.

Although the first embodiment described above is configured to calculate the injection quantity correction value so that the actual vehicle speed value approaches the target value of the vehicle speed, it is possible to calculate the injection quantity correction value by using the estimated vehicle speed value in place of the target value of the vehicle speed so that the actual vehicle speed value approaches the estimated vehicle speed value.

Further, although the first embodiment described above is configured to check whether the basic injection quantity value need be corrected by comparing the actual vehicle speed value and the estimated vehicle speed value, it possible to check whether the basic injection quantity value need be corrected by using the acceleration value in place of the vehicle speed value and comparing the actual acceleration value and the estimated acceleration value. In this case, as shown in FIG. 4, the microcomputer 3 uses the actual acceleration value in place of the actual vehicle speed value and executes steps S11 to S20 in the similar manner as steps S1 to S10 described above. That is, when the microcomputer 3 determines by the correction value calculation part 13 that the difference between the actual acceleration value and the estimated acceleration value is equal to or larger than the second predetermined value, the microcomputer 3 determines that the basic fuel injection quantity value need be corrected at step S14 (YES) and calculates the injection quantity correction value at step S15 so that the actual acceleration value approaches the target acceleration value.

Further, in the first embodiment described above, when the difference between the actual acceleration value and the estimated acceleration value is smaller than the fourth predetermined value in the second predetermined period, the microcomputer 3 determines that the learning condition is satisfied at step S19 (YES) and improves the estimation method, which is used to estimate the estimated acceleration value by the estimated value calculation part 11, by the estimation method improvement part 17. It is also possible to use the estimated acceleration value in place of the target acceleration value and calculate the injection quantity correction value so that the actual acceleration value approaches the estimated acceleration value.

The first embodiment described above provides the following advantages.

When the actual vehicle speed value or the actual acceleration value deviate largely from the estimated value of the same, the electronic control unit 1 calculates the injection quantity correction value for the basic injection quantity value and controls the driving of the injector 2 in proportion to the final injection quantity value, which is calculated by correcting the basic injection quantity value with the calculated correction value. Thus, even when the actual vehicle speed value or the acceleration value deviates largely from the estimated value of the same and the acceleration, which the driver wants, cannot be attained, it is possible to properly attain the acceleration as the driver wants. For example, when the vehicle enters the upslope from the level road while traveling on an express way, the vehicle decelerates although the driver maintains the same operation angle of the accelerator. However, it is possible not to cause traffic congestion at the upslope by providing the acceleration, which the driver desires.

Further, when the learning condition is satisfied, the electronic control unit 1 improves the estimation method, which is used to estimate the estimated values of the vehicle speed and the acceleration calculated by the estimated value calculation part 11. It is thus possible to eliminate influence of the air resistance and the rolling resistance, which depend on the vehicle characteristic and calculate the injection quantity correction value properly with high accuracy.

Second Embodiment

A second embodiment of an electronic control unit will be described next with reference to FIG. 5 to FIG. 8. Only different configuration and operation of the second embodiment from those of the first embodiment will be described. Although the first embodiment is configured to control driving of the injector 2, which injects fuel into the internal combustion engine, for changing engine output power, the second embodiment is configured to control driving of a throttle valve, which regulates an intake air quantity supplied into the internal combustion engine, for changing the engine output power, An electronic control unit 31 is configured to control driving of a throttle valve 32 and includes, an other parameter calculation part 34, a basic open angle calculation part 35 (basic physical quantity calculation part), a final open angle calculation part 36 (final physical quantity calculation part) and a driving control part 37 as replacements of the other parameter calculation part 8, the injection quantity calculation part 9, the final injection quantity calculation part 14 and the driving control part 15 described in the first embodiment.

The other parameter calculation part 34 calculates actual measured values, which will be effective to control driving of the throttle valve 34, based on detection signals inputted from other parameter sensors 38. The basic open angle calculation part 35 calculates a basic open angle value as a basic physical quantity value, which indicates a target open angle of the throttle valve 32 to change the engine power output, based on at least one of actual accelerator operation angle value, the actual engine rotation speed value, the actual vehicle speed and the actual acceleration value. The final open angle calculation part 36 calculates a final open angle by correcting the basic open angle with a correction value, when the correction value is calculated by the correction value calculation part 13, The final open angle calculation part 36 calculates a final open angle value by using the basic open angle value itself, when the open angle correction value is not calculated by the correction value calculation part 13. The learning condition check part 16 outputs a command value indicating the final open angle value to the throttle valve 32 and controls driving of the throttle valve 32 so that the throttle valve 32 opens to an angle, which is equal to the final open angle value.

Figure 2:
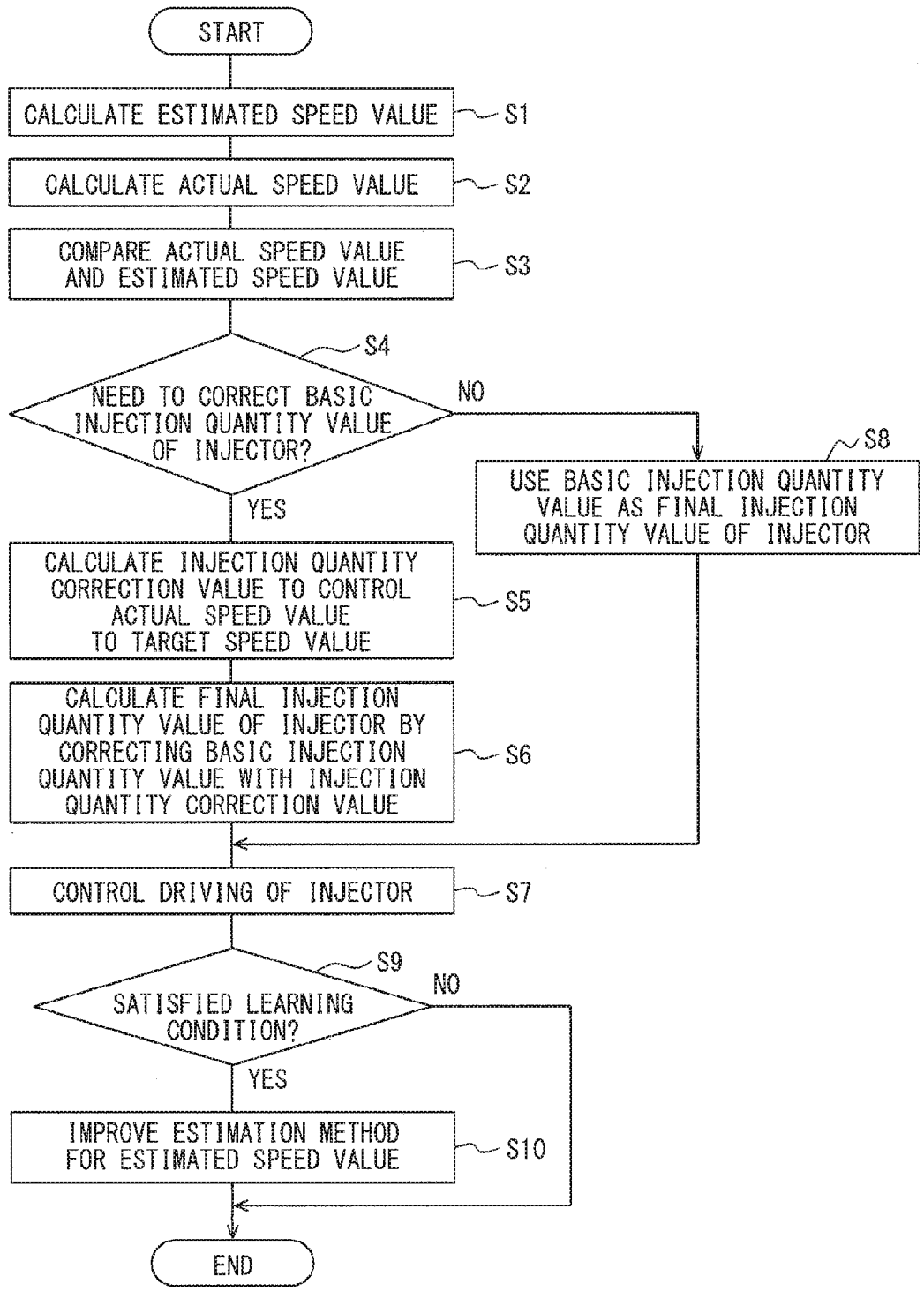
FIG. 2 is a flowchart showing control processing executed in the first embodiment.
Figure 6:
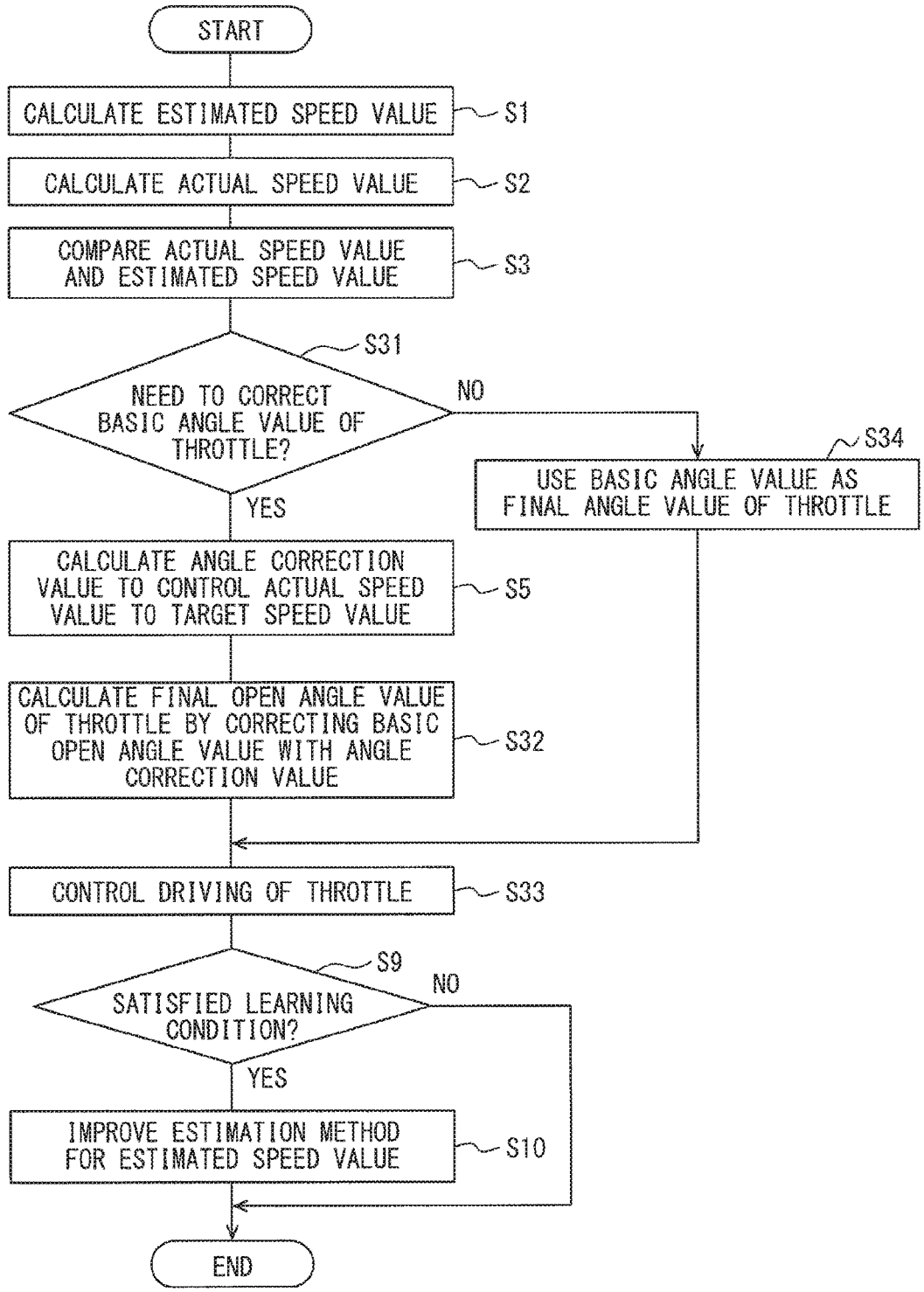
FIG. 6 is a flowchart showing control processing executed in the second embodiment.

In the second embodiment, as shown in FIG. 6, the microcomputer 33 executes S31 to S34 in place of steps S4 and S6 to S8 of FIG. 2, which are described in the first embodiment. When the microcomputer 33 determines that the open angle value need be corrected at step S31 (YES), the microcomputer 33 calculates the final open angle value by the final open angle calculation part 36 by correcting the basic open angle value with the open angle correction value at step S32. The microcomputer 33 outputs a command value indicating the calculated final open angle value for the throttle valve 32 and controls driving of the throttle valve 32 at step S33 so that the throttle valve 32 opens to the same angle as commanded.

Figure 7:
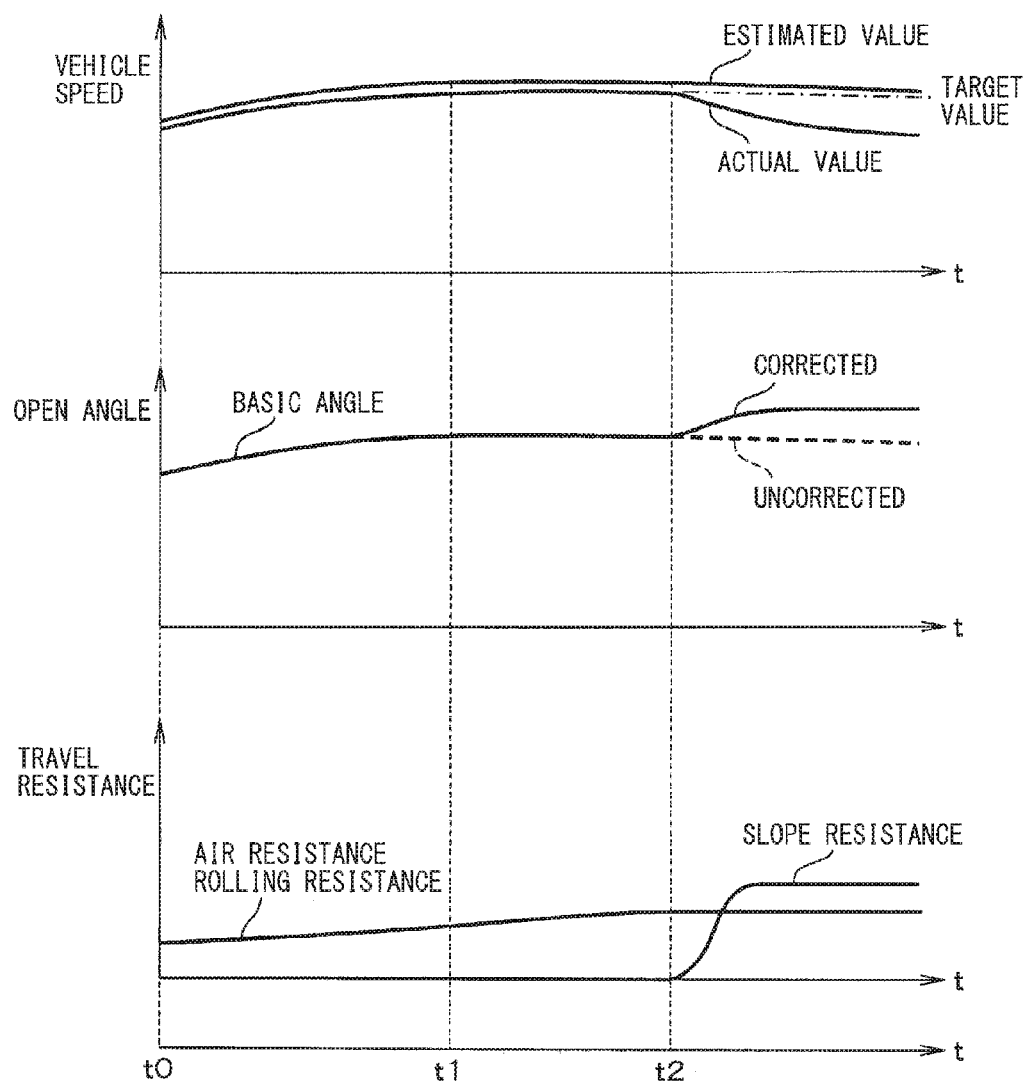
FIG. 7 is a timing chart showing a control operation performed by the control processing shown in FIG. 6.

That is, as shown in FIG. 7, when the slope resistance increases at time t2 as a result of entering of the vehicle from the level ground into the upslope for example, the actual vehicle speed value deviates from the estimated vehicle speed value largely. When the difference between the actual vehicle speed value and the estimated vehicle speed value equals to or exceeds the first predetermined value, the microcomputer 33 calculates the open angle correction value and calculates the final open angle value by correcting the basic open angle value with the open angle correction value. The microcomputer 33 controls the driving of the throttle valve 32 by the command value, which indicates the final open angle value calculated by correcting the basic open angle value with the open angle correction value, thereby to increase fuel injection quantity and engine output power to accelerate the vehicle. In this case as well, it is possible to use the actual acceleration value in place of the actual vehicle speed value and check whether the basic open angle value need be corrected by comparing the actual acceleration value with the estimated acceleration value.

Figure 4:
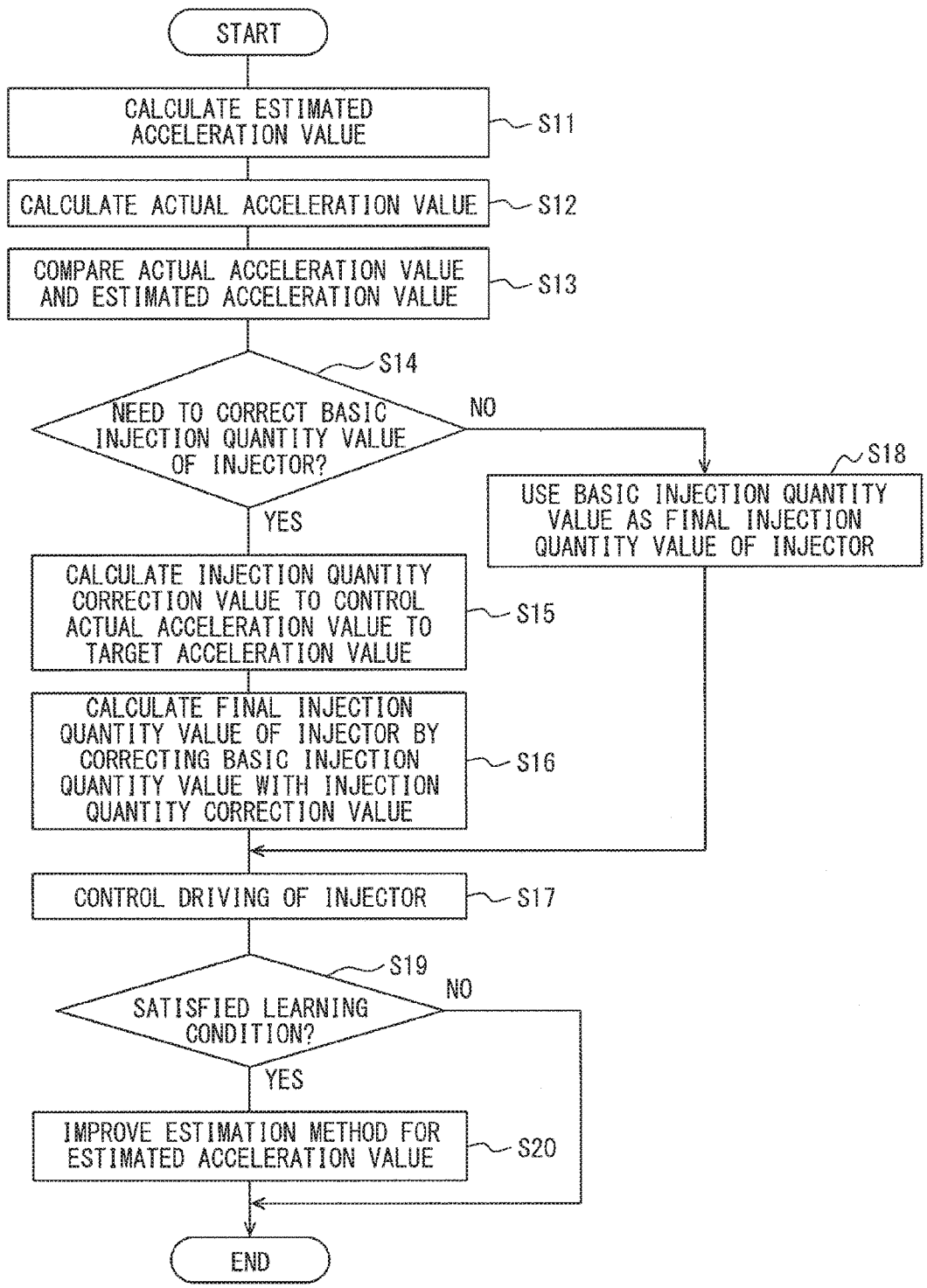
FIG. 4 is a flowchart showing another control processing executed in the first embodiment.
Figure 5:
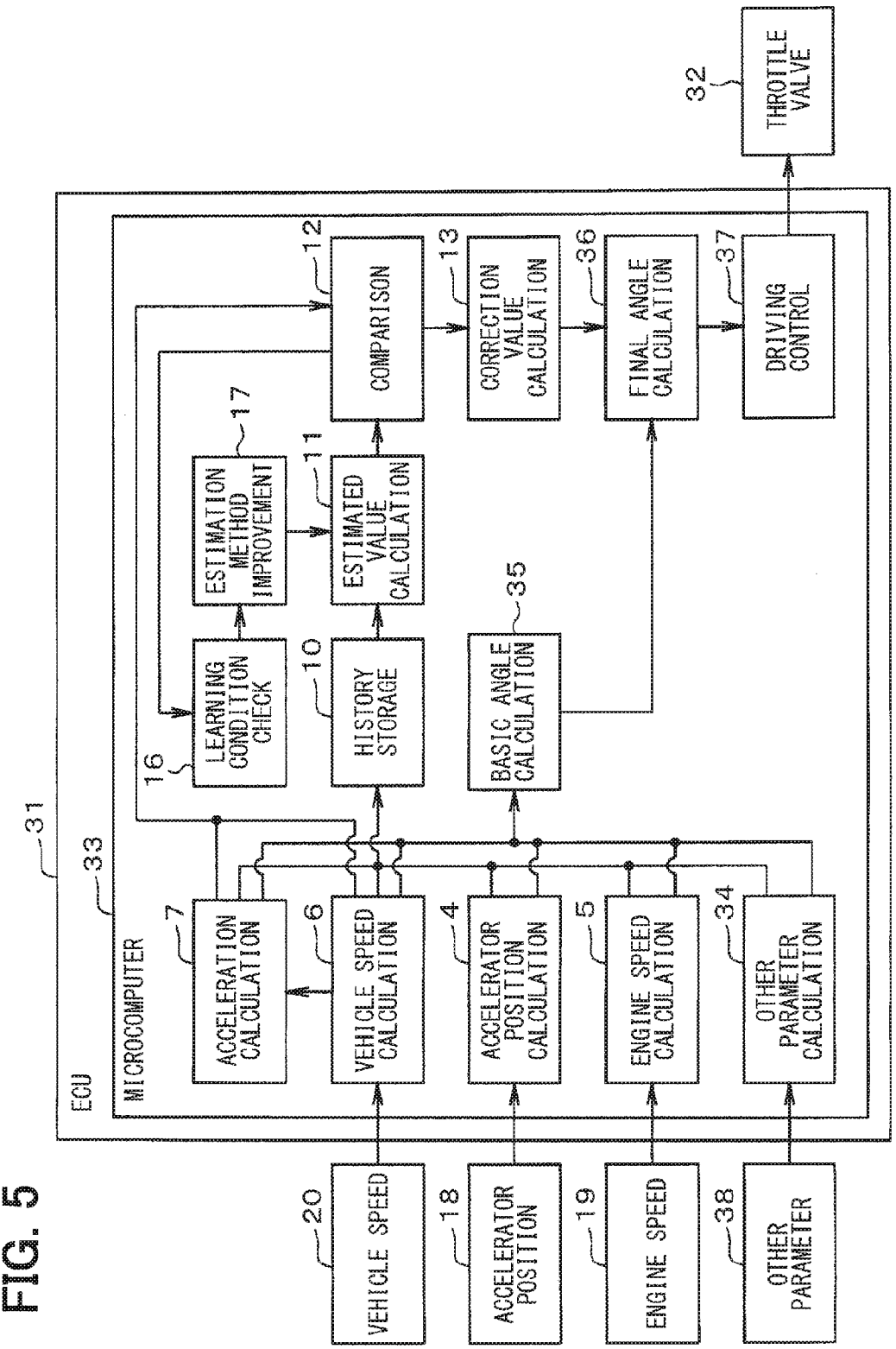
FIG. 5 is a functional block diagram showing a second embodiment of an electronic control unit.
Figure 8:
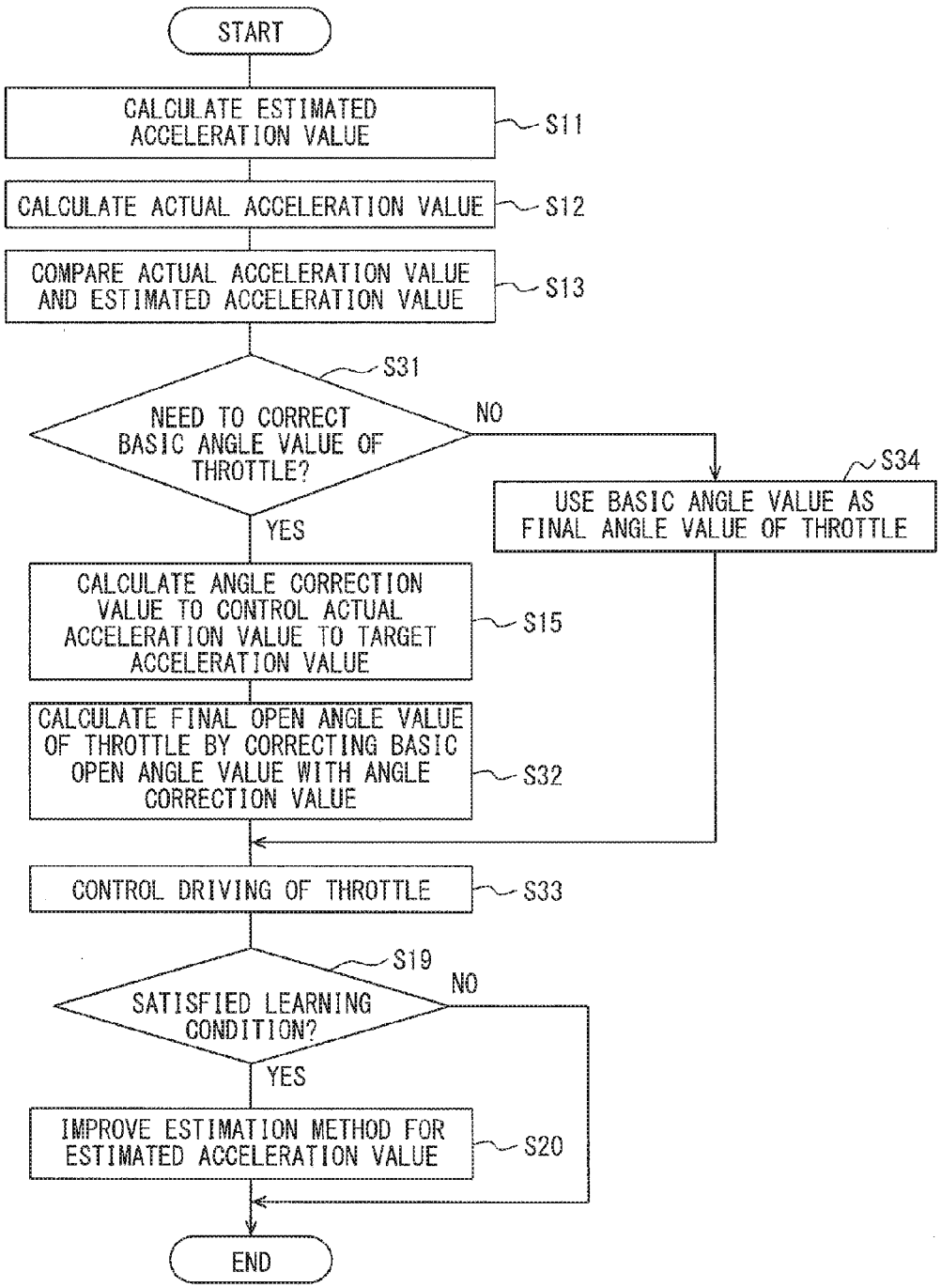
FIG. 8 is a flowchart showing another control processing executed in the second embodiment.

In the case that the microcomputer 33 checks whether the basic open angle value need be corrected by comparing the actual acceleration value with the estimated acceleration value, the microcomputer 33 executes steps S31 to S34 as shown in FIG. 8 in place of steps S14, S16 to S18 of FIG. 4 described in the first embodiment.

The second embodiment described above provides the following advantages. When the actual vehicle speed value or the actual acceleration value deviates largely from the estimated value of the same, the electronic control unit 31 calculates the open angle correction value for the basic open angle value and controls the driving of the throttle valve 32 in proportion to the final open angle value, which is calculated by correcting the basic open angle value with the calculated open angle correction value. Thus the second embodiment also provides the similar operations and advantages as the first embodiment. That is, even when the actual vehicle speed value or the actual acceleration value deviates largely from the estimated value of the same and the acceleration, which the driver wants, cannot be attained, it is possible to properly attain the acceleration as the driver wants.

Other Embodiment

The electronic control unit is not limited to the embodiments described above but may be modified an varied. For example, although the acceleration calculation part 7 is provided, it need not be provided in a case that the basic injection quantity value or the basic open angle value is corrected by using only the actual vehicle speed value and the estimated vehicle speed value and not using the actual acceleration value and the estimated vehicle speed value.

What is claimed is:

1. An electronic control for controlling an internal combustion engine of a vehicle, the electronic control unit comprising:
    a basic physical quantity calculation part for calculating, as a basic physical quantity value, a target physical quantity value related to an acceleration of a vehicle based on an actual accelerator operation angle value, an actual engine rotation speed value and at least one of an actual vehicle speed value and an actual acceleration value;
    a history storage part for storing the actual accelerator operation angle value, the actual engine rotation speed value and at least one of the actual vehicle speed value and the actual acceleration value;
    an estimated value calculation part for calculating at least one of an estimated vehicle speed value and an estimated acceleration value estimated from the history of stored values;
    a comparison part for performing at least one of a comparison of the actual vehicle speed value with the estimated vehicle speed value and a comparison of the actual acceleration value with the estimated acceleration value;
    a correction value calculation part for calculating a correction value for the basic physical quantity value based on at least one of a comparison result between the actual vehicle speed value and the estimated vehicle speed value and a comparison result between the actual acceleration value and the estimated acceleration value;
    a final physical quantity calculation part for calculating a final physical quantity value by correcting the basic physical quantity value with the correction value; and
    a driving control part for controlling the internal combustion engine based on the final physical quantity value calculated by correcting the basic physical quantity with the correction value.

2. The electronic control unit according to claim 1, wherein:
    the correction value calculation part calculates the correction value so that the actual vehicle speed value approaches a target speed value or the actual acceleration value approaches a target acceleration value, when at least one of a case that a difference between the actual vehicle speed value and the estimated vehicle speed value is equal to or larger than a first predetermined value and a case that a difference between the actual acceleration value and the estimated acceleration value is equal to or larger than a second predetermined value.

3. The electronic control unit according to claim 1, wherein:
    the correction value calculation part calculates the correction value so that the actual vehicle speed value approaches the estimated vehicle speed value or the actual acceleration value approaches the estimated acceleration value, when at least one of a case that a difference between the actual vehicle speed value and the estimated vehicle speed value is equal to or larger than a first predetermined value and a case that a difference between the actual acceleration value and the estimated acceleration value is equal to or larger than a second predetermined value.

4. The electronic control unit according to claim 1, further comprising:
    a learning condition check part for checking whether a learning condition is satisfied based on at least one of a comparison result between the actual vehicle speed value and the estimated vehicle speed value and a comparison result between the actual acceleration value and the estimated acceleration value; and
    an estimation method improvement part for improving a method of estimating at least one of the estimated vehicle speed value and the estimated acceleration value when the learning condition check part determines that the learning condition is satisfied.

5. The electronic control unit according to claim 4, wherein:
    the learning condition check part determines that the learning condition is satisfied when a difference between the actual vehicle speed value and the estimated vehicle speed value continues to be less than a predetermined speed difference value for a first predetermined period or when a difference between the actual acceleration value and the estimated acceleration value continues to be less than a predetermined acceleration difference value for a second predetermined period.

6. The electronic control unit according to claim 1, wherein:
    the internal combustion engine is provided with an injector for injecting fuel into the internal combustion engine;
    the basic physical quantity calculation part is a basic injection quantity calculation part, which calculates as the basic physical quantity value a basic injection quantity value indicating a target injection quantity value of fuel injected from the injector;
    the final physical quantity calculation part is a final injection quantity calculation part for calculating a final injection quantity value by correcting the basic injection quantity value with the correction value; and
    the driving control part controls driving of the injector so that an injection quantity value of fuel injected from the injector equals the final injection quantity value calculated by correcting the basic injection quantity value with the correction value.

7. The electronic control unit according to claim 1, wherein:
    the internal combustion engine is provided with a throttle valve for regulating an intake air quantity supplied into the internal combustion engine;
    the basic physical quantity calculation part is a basic open angle calculation part, which calculates as the basic physical quantity value a basic open angle value indicating a target open angle value of the throttle valve;
    the final physical quantity calculation part is a final open angle calculation part for calculating a final open angle value by correcting the basic open angle value with the correction value; and
    the driving control part controls driving of the throttle valve so that an open angle value of the throttle valve equals the open angle value calculated by correcting the basic open angle value with the correction value.

* * * * *